(12) United States Patent
Malik et al.

(10) Patent No.: US 11,244,044 B1
(45) Date of Patent: Feb. 8, 2022

(54) METHOD TO DETECT APPLICATION EXECUTION HIJACKING USING MEMORY PROTECTION

(71) Applicant: FireEye, Inc., Milpitas, CA (US)

(72) Inventors: Amit Malik, Bangalore (IN); Raghav Pande, Utlar (IN); Aakash Jain, Bangalore (IN)

(73) Assignee: Fireeye Security Holdings US LLC, Milpitas, CA (US)

( * ) Notice: Subject to any disclaimer, the term of this patent is extended or adjusted under 35 U.S.C. 154(b) by 0 days.

(21) Appl. No.: 16/277,907

(22) Filed: Feb. 15, 2019

Related U.S. Application Data

(63) Continuation of application No. 14/871,987, filed on Sep. 30, 2015, now Pat. No. 10,210,329.

(51) Int. Cl.
*G06F 21/55* (2013.01)
*H04L 29/06* (2006.01)
*G06F 21/53* (2013.01)

(52) U.S. Cl.
CPC ............ *G06F 21/554* (2013.01); *G06F 21/53* (2013.01); *H04L 63/1416* (2013.01); *H04L 63/1466* (2013.01); *G06F 2221/033* (2013.01)

(58) Field of Classification Search
CPC ........ G06F 21/554; G06F 21/53; G06F 21/52; G06F 21/12; G06F 2221/033; G06F 9/544; H04L 63/1466; H04L 63/1416
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Li et al., A VMM-Based System Call Interposition Framework for Program Monitoring, Dec. 2010, IEEE 16th International Conference on Parallel and Distributed Systems, pp. 706-711.

(Continued)

*Primary Examiner* — Brian F Shaw
(74) *Attorney, Agent, or Firm* — Rutan & Tucker, LLP

(57) ABSTRACT

According to one embodiment, a malware detection software being loaded into non-transitory computer readable medium for execution by a processor. The malware detection software comprises exploit detection logic, rule-matching logic, reporting logic and user interface logic. The exploit detection logic is configured to execute certain event logic with respect to a loaded module. The rule-matching logic includes detection logic that is configured to determine whether an access source is attempting to access a protected region and determine whether the access source is from a dynamically allocated memory. The reporting logic includes alert generating logic that is configured to generate an alert while the user interface logic is configured to notify a user or a network administrator of a potential cybersecurity attack.

22 Claims, 9 Drawing Sheets

(56) References Cited

U.S. PATENT DOCUMENTS

| | | | |
|---|---|---|---|
| 5,398,196 A * | 3/1995 | Chambers | G06F 21/566 714/28 |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowland | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sørhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petry et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,484,239 B1 * | 1/2009 | Tester | G06F 12/145 713/164 |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,464,340 B2 | 6/2013 | Ahn et al. | |
| 8,479,174 B2 | 7/2013 | Chiriac | |

(56) References Cited

U.S. PATENT DOCUMENTS

| | | | |
|---|---|---|---|
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,515,075 B1 * | 8/2013 | Saraf | G06F 21/566 380/277 |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,294 B2 | 4/2014 | Gooding et al. |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |

(56) References Cited

U.S. PATENT DOCUMENTS

| | | |
|---|---|---|
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0133777 A1 | 7/2004 | Kiriansky et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |

(56) References Cited

U.S. PATENT DOCUMENTS

| | | |
|---|---|---|
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0119445 A1 | 5/2011 | Gooding et al. |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |

(56) References Cited

U.S. PATENT DOCUMENTS

| | | |
|---|---|---|
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0351941 A1 | 11/2014 | Teller et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12--final107.pdf [retrieved on Dec. 15, 2014].

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits an Commodity Software", In Proceedings of the 12th Annual Network and Distributed System Security, Symposium (NDSS '05), (Feb. 2005).

(56) References Cited

OTHER PUBLICATIONS

Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Approach to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 14/871,987, filed Sep. 30, 2015 Non-Final Office Action dated Feb. 23, 2018.
U.S. Appl. No. 14/871,987, filed Sep. 30, 2015 Notice of Allowance dated Sep. 21, 2018.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.iso?reload=true&arnumber=990073, (Dec. 7, 2013).

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
AltaVista Advanced Search Results, "attack vector identifier". Http://www.altavista.com/web/results?ltag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?ltag=ody&pg=aq&aqmode=aqa=Event+Orch- esrator . . . , (Accessed on Sep. 3, 2009).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Deutsch, P. , "Zlib compressed data format specification version 3.3" RFC 1950, (1996).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.

(56) References Cited

OTHER PUBLICATIONS

FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max , et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Leading Colleges Select FireEye to Stop Malware-Related Data Breaches, FireEye Inc., 2009.

\* cited by examiner

METHOD TO DETECT APPLICATION EXECUTION HIJACKING USING MEMORY PROTECTION

CROSS REFERENCE TO RELATED APPLICATIONS

This application is a continuation of U.S. patent application Ser. No. 14/871,987 filed Sep. 30, 2015, now U.S. Pat. No. 10,210,329, issued Feb. 19, 2019, the entire contents of which is incorporated herein by reference.

FIELD

Embodiments of the disclosure relate to the field of cyber-security. More specifically, one embodiment of the disclosure relates to a system, apparatus and method for identifying potential application-execution hijacking attacks using memory protection techniques.

GENERAL BACKGROUND

Over the last decade, malicious software has become a pervasive problem for Internet users as many networked resources include vulnerabilities that are subject to attack. For instance, over the past few years, more and more vulnerabilities are being discovered in software that is loaded onto network devices, such as vulnerabilities within operating systems for example. While some vulnerabilities continue to be addressed through software patches, prior to the release of such software patches, network devices will continue to be targeted for attack by malware, namely information such as computer code that attempts during execution to take advantage of a vulnerability in computer software by acquiring sensitive information or adversely influencing or attacking normal operations of the network device or the entire enterprise network.

For example, one commonly exploited vulnerability is known as a buffer overflow. In general, programs write data to a buffer. However, during a buffer overflow, the written data overruns the buffer's allocated boundary and overwrites adjacent memory locations. As a result, buffer overflows are the basis of many software vulnerabilities and can be maliciously exploited to cause erratic program behavior, memory access errors, incorrect results, and/or the misappropriation of sensitive data such as intellectual property.

Various techniques have been attempted to detect and prevent software exploits, however each technique has various tradeoffs One of the most generic techniques include Data. Execution Prevention (DEP), which is generally provided for by a processor. Using. DEP, memory spaces are automatically marked as non-executable unless they are explicitly told they are being allocated for executable code Specifically, a flag is set on a per-page basis and is set via a bit in the page table entry (PTE) for that page. If an attempt is made to execute code from a memory region that is marked as non-executable, the hardware feature passes an exception to DEP within the operating system and provides a corresponding indication. Consequently, DEP causes an exception within the code stack that is executing, thereby causing a failure coupled with an access violation DEP may be made stronger by CPU support with the No-Execute (NX) bit, also known as the XD bit, EVP bit, or XN bit, which allows the CPU to enforce execution rights at the hardware level.

Unfortunately, in short order, bypasses were developed by hackers to overcome DEP schemes. Specifically, a technique known as Return-Oriented Programming (ROP) was developed to circumvent DEP schemes. ROP techniques search for portions of code known as ROP gadgets in legitimate modules within a particular process. ROP gadgets generally comprise of one or more instructions, followed by a return. Combining a plurality of ROP gadgets along with appropriate values in the stack allows for the malicious shell code to be executed. Typically, the hacker's goal is to locate the address of a memory protection API, such as Virtual Protect, and mark the relevant memory region as executable (as compared to non-executable) Thereafter, the hacker may introduce a final ROP gadget to transfer the execution to the relevant memory region to execute the shellcode. As a result, the DEP scheme may be bypassed.

In an effort to make potential DEP bypasses more difficult, Address Space Layout Randomization (ASLR) was developed. ASLR involves randomly offsetting memory structures and module base addresses such that merely "guessing" the location of ROP gadgets and APIs becomes exceedingly difficult. On certain operating systems, such as the Microsoft® Windows® operating system, ASLR may be configured to randomize the location of executables and Dynamic Link Libraries (DLLs) in memory, stacks and heaps. For example, when an executable is loaded into memory, the operating system may receive a processor's timestamp counter (TSC), shift the TSC by a nominal amount, perform a division (e.g., a modulo operation), and then add a constant. The result of this operation may then be multiplied by yet another constant, at which point an executable image is loaded at the calculated offset.

However, some DLLs (including for example, ntdll, kernel32, etc.) are shared in memory across processes, their offsets are determined by a system-wide bias value that is computed at boot. Notably, the offset value is computed only once per boot. When DLLs are loaded, they are disposed into a shared memory region. The order in which modules are loaded is randomized too. Furthermore, when threads are created, their stack base address is randomized. Once the base address has been calculated, another value is derived from the TSC to compute the final stack base address. By using this method, ASLR was intended to provide a high theoretical degree of randomness.

When all of these ALSR mechanisms were combined with DEP, it was understood that shellcode would be prevented from executing because the memory region could not be executed. Moreover, it was expected that potential hackers also would not know the location of any ROP instructions in memory because the ROP gadget's address would be unreliable due to the randomization.

Nonetheless, bypasses were developed by hackers to overcome ASLR mechanisms so that DEP schemes could be easily exploited. For example, NOP sleds may be utilized to create a probabilistic exploit. Furthermore, using a pointer leak, a hacker can make an educated guess regarding a value on the stack at a reliable location to locate a usable function pointer or ROP gadget.

In other words, using these and other techniques, it may be possible to create a payload that reliably bypasses both DEP and ASLR. Moreover, once ASLR and DEP are compromised, it is a straight forward matter to control the execution of shellcode in the context of the application. Therefore, there exists a need for a system, apparatus and method for identifying potential application-execution hijacking attacks using memory protection techniques so as to prevent the execution of malicious shellcode.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
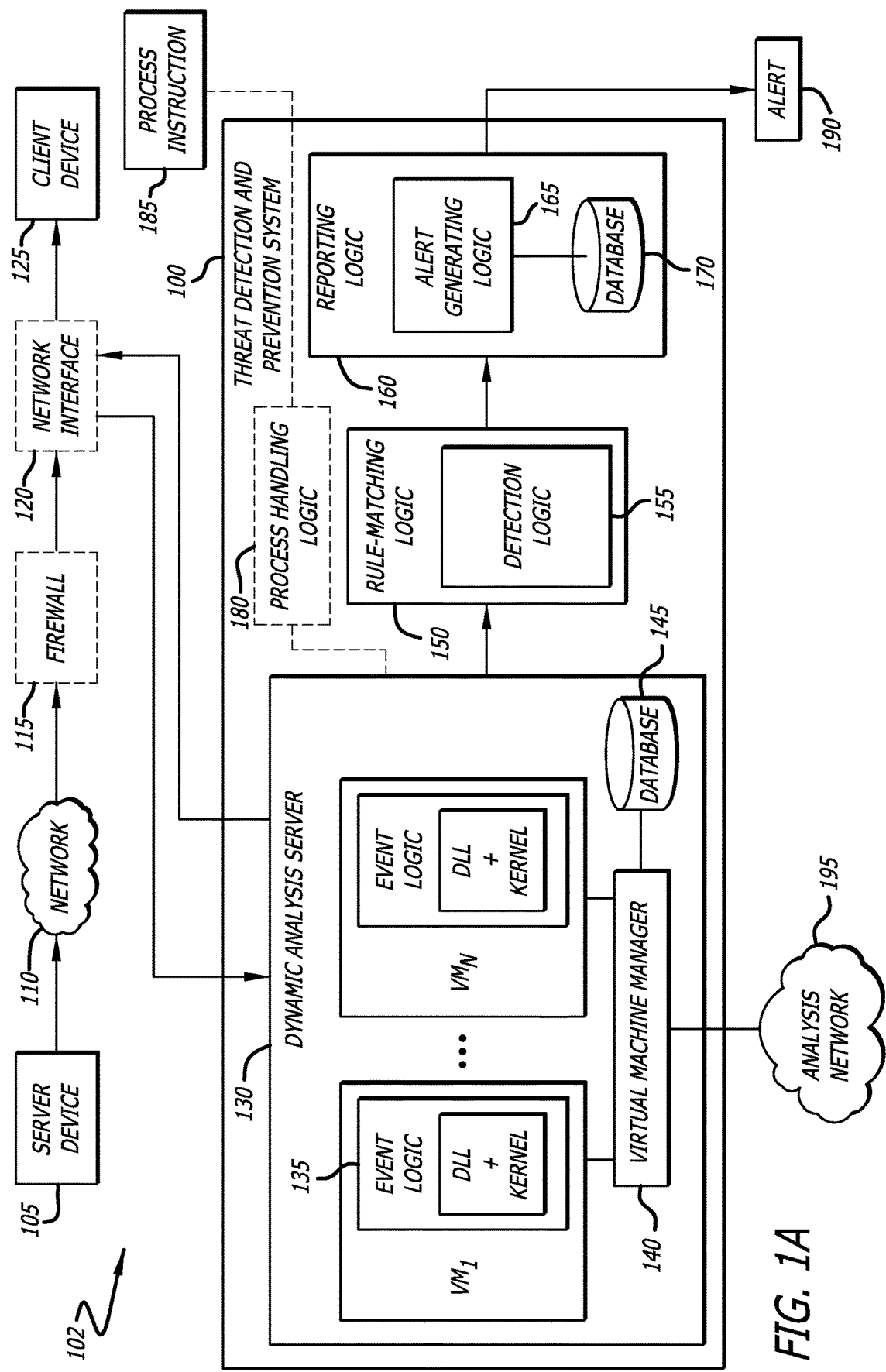
FIG. 1A is an exemplary logical representation of a communication system deploying an application-execution hijacking detection system communicatively coupled to a network.

Various embodiments of the disclosure relate to a network appliance, such as an application-execution hijacking detection system (AEH) system for example, where the network appliance comprises a dynamic analysis server. According to one embodiment of the disclosure, information from received network traffic is analyzed to determine whether at least a portion of the received network traffic is likely to be associated with malware. A portion of the received network traffic, (hereinafter "object(s)"), that is determined to likely be associated with malware is deemed "suspicious." The dynamic analysis server comprises virtual execution logic to automatically analyze one or more objects while the object(s) executes within a virtual machine (VM). In particular, the dynamic analysis server comprises event logic to analyze whether attempts have been made to access protected (guarded) pages of loaded modules so as to detect a potential AEH attack. In one embodiment, instead of implementing virtual execution logic, an AEH detection application may be configured so as to communicate the output of DLL/kernel logic directly into an application running on a mobile device, for example. It is envisioned that deployments other than VM-based deployments may also be used, including but not limited to runtime system deployments and the like.

Herein, according to one embodiment of the disclosure, the dynamic analysis server is configured to monitor and store access events of guarded page areas of any of various loaded modules. Any time a read, write or execute operation ("access event") is performed on such guarded page areas, the access event is analyzed to determine whether it is malicious (and therefore associated with a malware attack), or non-malicious. For example, if the access source is from the heap, then there is a high likelihood that the access event is malicious. As used herein, the heap refers to any portion of memory where dynamically allocated memory resides. More specifically, in the context of loaded modules, the memory type is a "MEM_IMAGE" type. Conversely, if the memory type at any address is not the "MEM_IMAGE" type, then the address is from the heap, and therefore malicious. It is envisioned that upon a finding of maliciousness, an alert may be generated to communicate details of the access event, including for example the access source and corresponding memory type. In some embodiments, determining that an access event is malicious may result in the termination of the respective application, process and/or operation.

I. Terminology

In the following description, certain terminology is used to describe features of the invention. For example, in certain situations, term "logic" is representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. During analysis, for example, the object may exhibit a set of expected characteristics and, during processing, a set of expected behaviors. The object may also exhibit a set of unexpected characteristics and a set of unexpected behaviors that may evidence an exploit and potentially allow the object to be classified as an exploit.

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may include packets, frames, or cells.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

According to one embodiment, the term "malware" may be construed broadly as any code or activity that initiates a malicious attack and/or operations associated with anomalous or unwanted behavior. For instance, malware may correspond to a type of malicious computer code that executes an exploit to take advantage of a vulnerability, for example, to harm or co-opt operation of a network device or misappropriate, modify or delete data. Malware may also correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of an network device executing application software in an atypical manner (a file is opened by a first process where the file is configured to be opened by a second process and not the first process); (2) alter the functionality of the network device executing that application software without any malicious intent; and/ or (3) provide unwanted functionality which may be generally acceptable in another context. Additionally, malware may be code that initiates unwanted behavior which may be, as one example, uploading a contact list from an endpoint device to cloud storage without receiving permission from the user.

The term "shellcode" refers to a small piece of executable code that resides in data (e.g., is injected into data), is used as a payload of malware, or, in some cases, contains a shell command to execute an exploit.

The term "transmission medium" is a physical or logical communication path between two or more network devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In certain instances, the term "detected" is used herein to represent that there is a prescribed level of confidence (or probability) on the presence of an exploit within an object under analysis.

The term "pattern" should be construed as a predefined grouping of instructions. A pattern may appear in memory, such as memory allocated in a virtual execution environment for use by an application being executed by a virtual machine. In some embodiments, the length of the pattern may correspond to the operating system of the network device which is undergoing analysis. For example, a pattern may consist of four bytes when the network device is running a 32-bit operating system (this may be referred to as a double word, or "DWORD"). Therefore, the DWORD may contain up to four (4) instructions, which may be four (4) NOP instructions, for example. Alternatively, a pattern may consist of eight bytes when the network device is running a 64-bit operating system (this may be referred to as a quad word, or "QWORD"). Therefore, the QWORD may contain up to eight (8) instructions, which may be eight (8) NOP instructions, for example.

The terms "network device" or "network appliance" should be construed as any electronic device with the capability of connecting to a network. Such a network may be a public network such as the Internet or a private network such as a wireless data telecommunication network, wide area network, a type of local area network (LAN), or a combination of networks. Examples of a network device may also include, but are not limited or restricted to mobile devices, such as a laptop, a mobile phone, a tablet, a computer, etc. or any other relatively portable device.

The term "computerized" generally represents that any corresponding operations are conducted by hardware in combination with software and/or firmware. Also, the terms "compare" or "comparison" generally mean determining if a match (e.g., a certain level of correlation) is achieved between two items where one of the items may include a particular signature pattern.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Application-Execution Hijacking Detection System

A. General Architecture of Network Appliance Deploying Application-Execution Hijacking Detection Logic Referring to FIG. 1A, an exemplary logical representation of an AEH detection environment 102 communicatively coupled to a network 110 via a network interface 120 is shown. The AEH detection environment 102 comprises a server device 105, an optional firewall 115, a client device 125 and an AEH detection system 100 communicatively coupled to the network 110 via a network interface 120. The AEH system 100 is further communicatively coupled to an analysis network 195. It is envisioned that the analysis network 195 may be configured to store and access data regarding malware attacks across a number of objects, including for example, web-based, email-based, and file-based threats. Moreover, it is envisioned that the analysis network 195 may be configured to store historical information regarding previously analyzed and/or known malware attacks. The analysis network 195 may also be periodically or aperiodically updated so as to store information regarding new malware attacks, reports, alerts, and/or corresponding features, for example.

Herein, according to the embodiment illustrated in FIG. 1A, the AEH detection system 100 comprises a network appliance that is adapted to analyze information associated with network traffic routed over a communication network 110 between at least one server device 105 and at least one client device 125. The communication network 110 may include a public network such as the Internet, in which case an optional firewall 115 (represented by dashed lines) may be interposed in the communication path between the public network and the client device 125. Alternatively, the communication network 110 may be a private network such as a wireless data telecommunication network, wide area network, a type of local area network (LAN), or a combination of networks.

As shown, the AEH detection system 100 may be communicatively coupled with the communication network 110 via a network interface 120. In general, the network interface 120 operates as a data-capturing device (sometimes referred to as a "tap" or "network tap") that is configured to receive data propagating to/from the client device 125 and provide at least some of this data to the AEH detection system 100. Alternatively, it should be understood that the AEH detection system 100 may be positioned behind the firewall 115 and in-line with client device 125.

According to one embodiment of the disclosure, the network interface 120 is capable of receiving and routing objects associated with network traffic to the AEH detection system 100. The network interface 120 may provide the entire object or certain content within the object, for example, one or more files or packets that are part of a set of flows, packet payloads, or the like. In some embodiments, although not shown, network interface 120 may be contained within the AEH detection system 100.

It is contemplated that, for any embodiments where the AEH detection system 100 is implemented as a dedicated appliance or a dedicated computer system, the network interface 120 may include an assembly integrated into the appliance or computer system that includes a network interface card and related logic (not shown) for connecting to the communication network 110 to non-disruptively "tap" network traffic propagating through firewall 115 and provide either a duplicate copy of at least a portion of the network traffic or at least a portion the network traffic itself to the dynamic analysis server 130 and an optional static analysis server, if included within the AEH detection system 100. In other embodiments, the network interface 120 can be integrated into an intermediary device in the communication path (e.g., firewall 115, router, switch or other networked network device, which in some embodiments may be equipped with Switched Port Analyzer "SPAN" ports) or can be a standalone component, such as an appropriate commercially available network tap. In virtual environments, a virtual tap (vTAP) can be used to duplicate files from virtual networks.

As further shown in FIG. 1A, the AEH detection system 100 comprises the dynamic analysis server 130, rule-matching logic 150, and reporting logic 160. In some embodiments, an optional static analysis server may be provided within the AEH detection system 100 so as to perform static scanning on a particular object, namely heuristics, exploit signature checks and/or vulnerability signature checks for example. The optional static analysis server and the dynamic analysis server 130 may be one or more software modules executed by the same processor or different processors, where these different processors may be located within the same processor package (e.g., different processor cores) and/or located at remote or even geographically remote locations that are communicatively coupled (e.g., by a dedicated communication link) or a network.

Herein, the dynamic analysis server 130 comprises a virtual machine manager 140, a database 145 and one or more virtual machines (VMs) $VM_1$-$VM_N$ (N≥1) that may be configured to perform in-depth dynamic analysis with respect to one or more suspicious objects. For instance, the dynamic analysis server 130 may simulate transmission and/or receipt of packets or other objects by a destination device comprising the virtual machines to determine whether certain guarded areas of loaded modules are being accessed in an effort to hijack a particular application.

According to one embodiment, each of the VMs (e.g., $VM_1$-$VM_N$) within the dynamic analysis server 130 may be configured with a software profile corresponding to a software image stored within the database 145 that is communicatively coupled with the virtual machine manager 140. Alternatively, the VMs (e.g., $VM_1$-$VM_N$) may be configured according to a prevalent software configuration, software configuration used by a network device within a particular enterprise network (e.g., client device 125), or an environment that is associated with the object to be processed, including software such as a web browser application, PDF™ reader application, or the like.

However, for a known vulnerability, the VMs (e.g., $VM_1$-$VM_N$) may be more narrowly configured to profiles associated with vulnerable modules. For example, if the access source comprises a certain memory type, $VM_1$-$VM_N$ may be configured for faster processing and corresponding log file generation. Similarly, when relevant, if the access source is attempting to access a guarded page of its own module, then $VM_1$-$VM_N$ may be configured accordingly.

In general, the dynamic analysis server 130 is adapted to execute one or more VMs (e.g., $VM_1$-$VM_N$) to detect an application-execution hijacking attempt by simulating the execution of an object under analysis within a run-time environment as expected by the type of object. For example, the dynamic analysis server 130 analyzes the received network traffic and determines which application is suitable for executing an object of the received network traffic within one or more VMs, namely $VM_1$, and/or $VM_N$.

Each of the VMs ($VM_1$-$VM_N$) comprise event logic 135 that is configured so as to detect and/or store all access events, however the event logic 135 may be more narrowly tailored to only focus on access events with respect to guarded areas. The event logic 135 comprises Dynamic Link Library (DLL)/kernel logic 138 that is configured to respond to the occurrence, during computation for example, of exceptions. As used herein, "exceptions" generally refer to anomalous or exceptional conditions requiring special processing that may change the normal flow of a program's execution. It is envisioned that when an attempt is made to access a guarded area, an exception is generated and appropriately handled by the DLL/kernel logic 138. Preferably, the DLL/kernel logic 138 is configured to handle all exceptions that may occur in the event that a guarded area is accessed. In general, the DLL/kernel logic 138 may be considered a library that contains code and data that may be used by more than one programs simultaneously to promote code reuse and efficient memory usage. By using the DLL/kernel logic 138, a program may be modularized into separate components, known as modules. Each module may be loaded into a main program at run time, if that module is loaded. Consequently, as used herein, the DLL/kernel logic 138 utilizes this modular nature to detect access events in conjunction with the AEH detection system 100 to ultimately determine whether the access events are malicious or not.

In one embodiment, the event logic 135 may be configured to generate a log file corresponding to the access events, with special focus being paid to guarded page areas. It is envisioned that the log file may comprise any suitable file format. Once generated, the log file may be communicated to the rule-matching logic 150 so that certain detection logic 155 may be applied thereon.

In one embodiment, the detection logic 155 is configured to apply certain rules on the generated log file. Once the rules are applied, the result is communicated to the reporting logic 160. If maliciousness is found, an alert 190 is generated. The alert 190 may comprise details with respect to the object, such as, by way of non-limiting example, the source of a particular access event, and/or its memory type. In one embodiment, the DLL/kernel logic 138 may be configured to directly block one or more malicious objects by terminating the application and/or process that has been attacked, rather than generating a log file, using the optional process-handling logic 180, for example. It is envisioned that the rules may also be configured so as to perform a probabilistic analysis with respect to some or all of the data associated with the generated log file. For example, the occurrence of an access event may indicate to some level of probability, often well less than 100%, that the access event comprises a certain exploit or exhibits certain elements associated with malware. In one embodiment, the rule-matching logic 150 may be configured to take certain action, including for example, generating an alert 190 if the probability exceeds a prescribed value, for example.

Figure 1B:
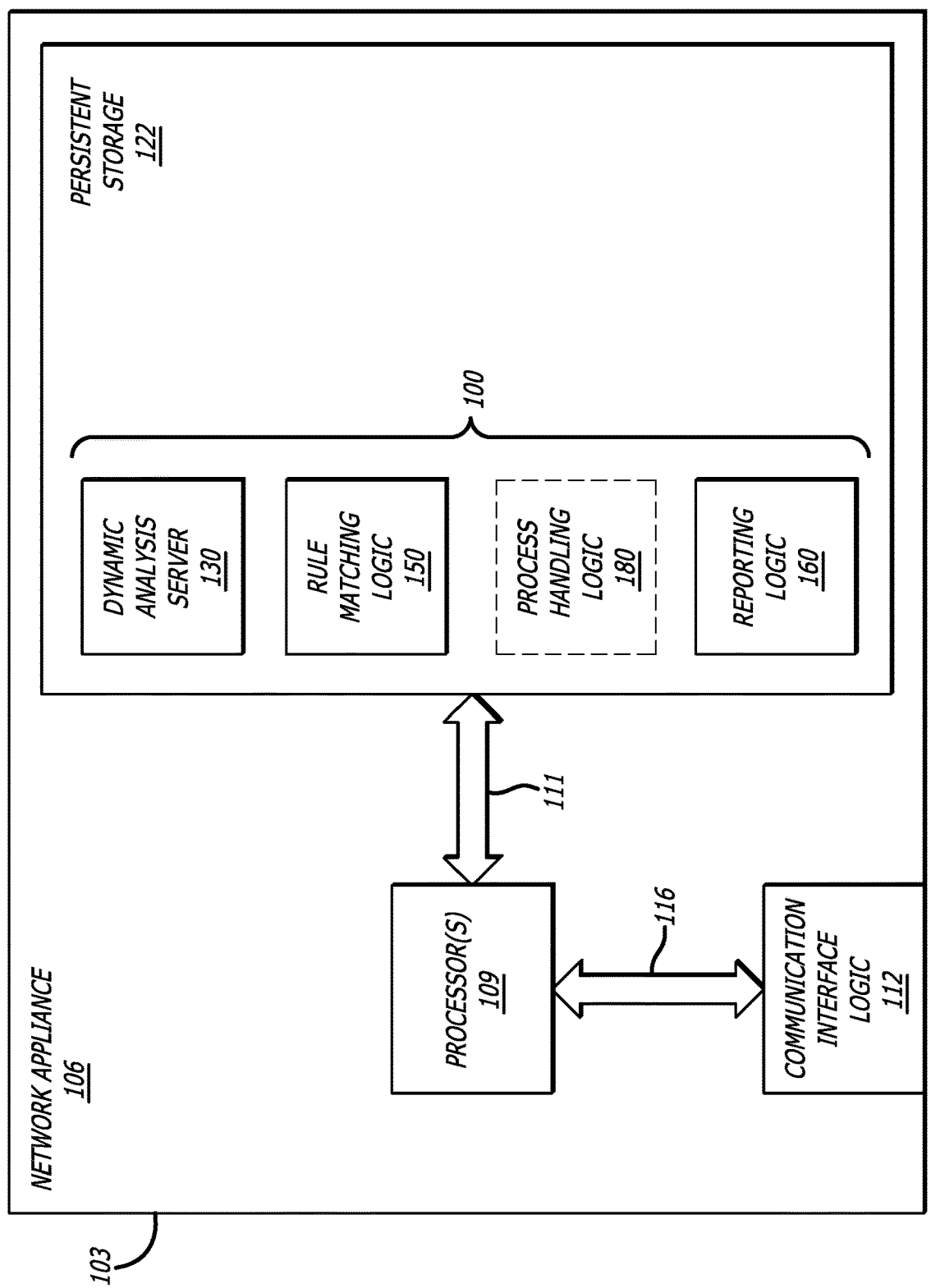
FIG. 1B an exemplary embodiment of a representation of the application-execution hijacking detection system of FIG. 1A.

Referring now to FIG. 1B, an exemplary embodiment of a representation of the AEH detection system of FIG. 1A is shown. In one embodiment, a network appliance 106 comprises a housing 103, which is made entirely or partially of a rigid material (e.g., hardened plastic, metal, glass, composite or any combination thereof) that protect circuitry within the housing 103, namely one or more processors 109 that are coupled to communication interface logic 112 via a first transmission medium 116. Communication interface logic 112 enables communications with other AEH detection systems 100 and/or the analysis network 195 of FIG. 1A, for example. According to one embodiment of the disclosure, communication interface logic 112 may be implemented as a physical interface including one or more ports for wired connectors. Additionally, or in the alternative, communication interface logic 112 may be implemented with one or more radio units for supporting wireless communications with other electronic devices.

Processor(s) 109 may further be coupled to persistent storage 122 via a second transmission medium 119. According to one embodiment of the disclosure, persistent storage 122 may include the AEH detection system 100, which in one embodiment comprises (a) dynamic analysis server 130; (b) rule-matching logic 150; (c) optional process handling logic 180; and reporting logic 160. It is envisioned that one or more of these systems (or logic units) could be implemented externally from the AEH detection system 100 without extending beyond the spirit and scope of the present disclosure.

Figure 2:
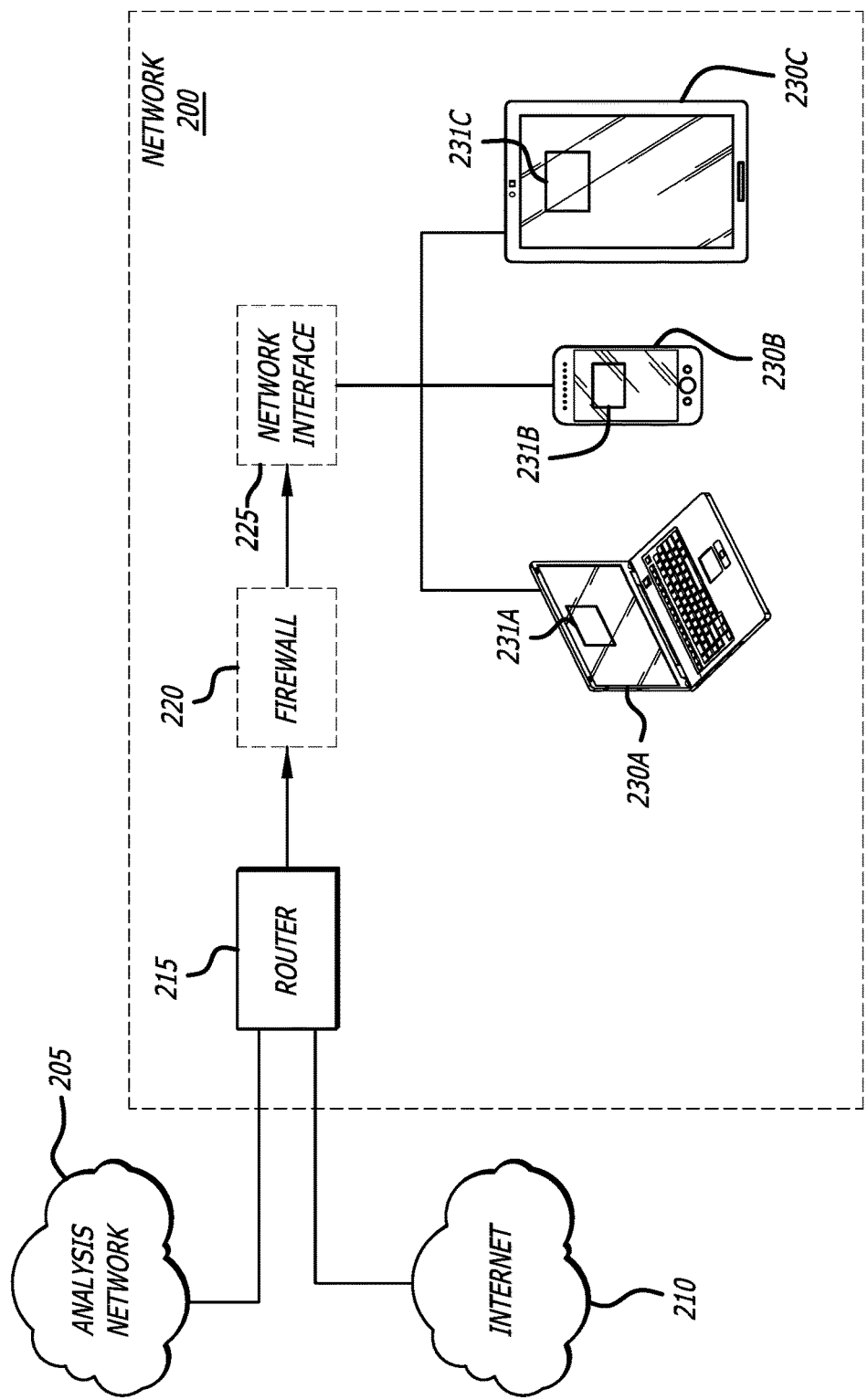
FIG. 2 is an exemplary representation of a plurality of mobile devices deploying an application-execution hijacking detection application communicatively coupled to a network.

B. General Architecture of a Mobile Device Deploying an Application-Execution Hijacking Detection Application Referring to FIG. 2, a plurality of mobile devices 230A-230C deploying an AEH detection application communicatively coupled to an analysis network 205 is shown. In general, a network environment 200 is shown, wherein a router 215 is communicatively coupled to analysis network 205 and Internet 210. The router is also communicatively coupled to an optional firewall 220, which itself may be communicatively coupled to a network switch 225. As shown, the plurality of mobile devices 230A-230C may also be communicatively coupled to the analysis network 205 and Internet 210 using any transmission medium, including without limitation, wireless and hardwired connection schemes. It is envisioned that an exemplary AEH detection application 231A-231C corresponding to each of the mobile devices may be installed to detect application-execution hijacking malware. Of course, although only three mobile devices 230A-230C are shown in FIG. 2, any number of devices may have the exemplary AEH detection application 231A-231C loaded thereon. In one embodiment, the AEH detection application may be a downloaded from an app store, website, etc., and thus stored and made locally available with respect to a mobile device.

Figure 3:
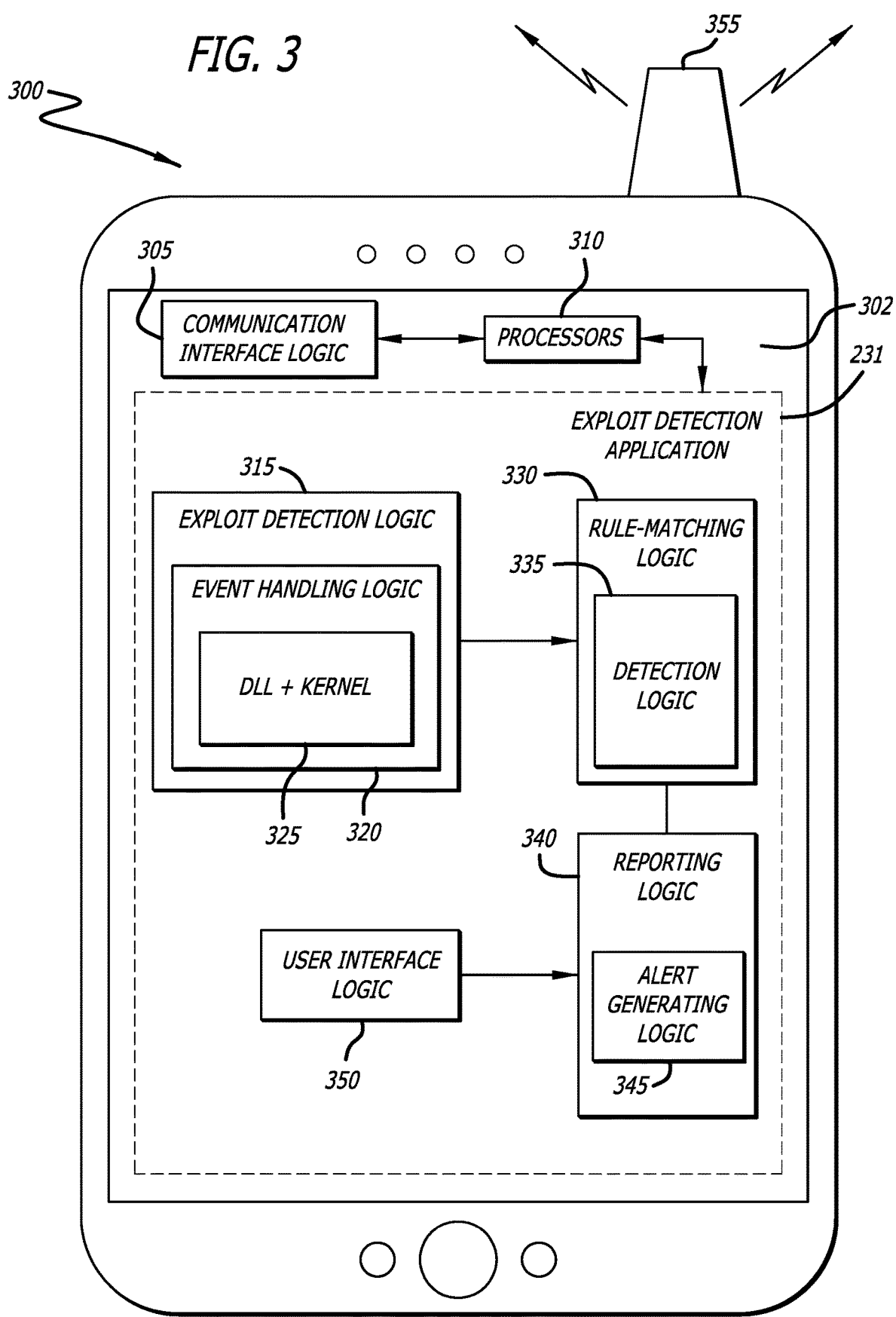
FIG. 3 is an exemplary embodiment of a mobile device deloying an application-execution hijacking detection application according to the present disclosure.

Referring to FIG. 3, a mobile device may be configured to deploy the AEH detection application 231 of FIG. 2. As shown in FIG. 3, for illustrative purposes, the network device 300 is represented as a mobile device (e.g., smartphone, tablet, laptop computer, netbook, etc.). The mobile device 300 includes a display screen 302, one or more processors 310, a receiver and/or transmitter (e.g. transceiver) such as an antenna 355, and communication interface logic 305. In one embodiment, the AEH detection application 231 comprises exploit detection logic 315, rule-matching logic 330, reporting logic 345, and user interface logic 350.

As shown, the AEH detection application 231 is substantially similar to the AEH detection environment 102 of FIG. 1, except that instead of implementing VMs, the AEH detection application 231 communicates the output of the DLL/kernel logic 315 directly into the AEH detection application 231 running on the mobile device 300. After the output of the DLL/kernel logic 315 is loaded, a log file is generated comprising access events, again with special attention being paid to access events corresponding to guarded page areas. It is envisioned that the log file may be customized so as to only focus on certain criteria. For example, the log file may be filtered according to a particular access source, the memory type being accessed, and in some instances, whether the access source is from the heap. Once the log file is generated, it is communicated to the reporting logic 340, comprising the alert generation logic 345, which may generate an alert and/or route the alert to the analysis network 205 via the communication interface logic 305, for further analysis. In addition, the alert may be routed to the Internet 210 using communication interface logic 305 for further analysis by a network administrator, for example. The reporting logic 340 may issue an alert or report (e.g., an email message, text message, display screen image, etc.) to security administrators or the user, for example, communicating the urgency in handling one or more predicted attacks using the user interface logic 350. The AEH detection application 231 may trigger a further analysis of the object to verify the behavior of the object as an exploit. It is envisioned that the generated alert or report may also comprise instructions so as to prevent one or more predicted malware attacks.

II. Application-Execution Hijacking Detection Methods

Figure 4:
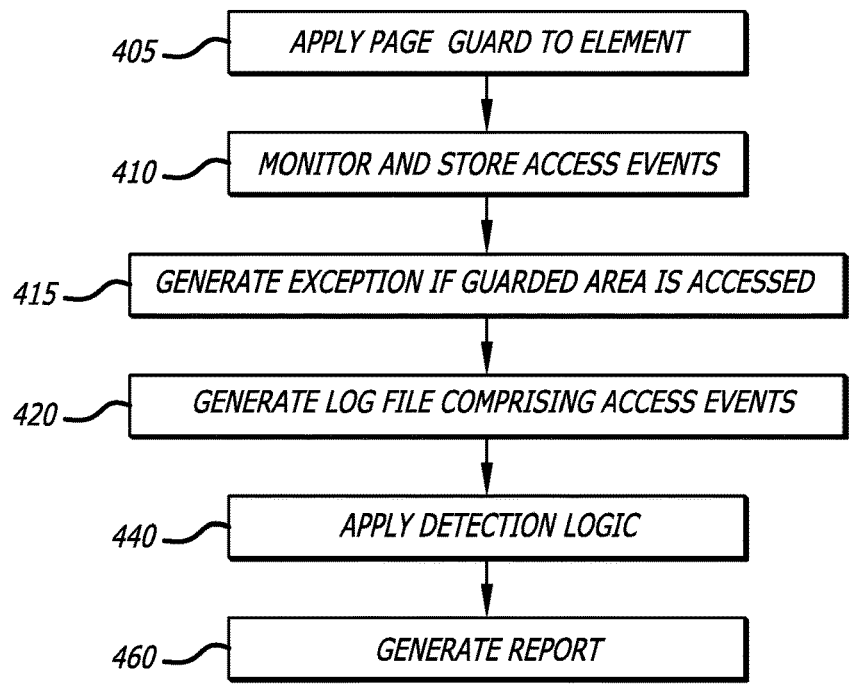
FIG. 4 is an exemplary block diagram of an operational flow of an application-execution hijacking detection system.

FIG. 4 is a flowchart of an exemplary method for detecting AEH malware by applying any of various protection mechanisms, including by way of non-limiting example, applying a page guard to an element of a loaded module so as to establish a protected region. Specifically, as shown at block 405, a page guard is applied to an element of a loaded module, such as by way of non-limiting example, a base address, import table (IT), and/or a process environment block. In general, page guards (also referred to as a "guard page" or "PAGE_GUARD") provide an alarm for memory page access. Page guards may be used to monitor the growth of large dynamic data structures. For example, certain operating systems use page guards to implement automatic stack checking.

It is to be understood that to create a page guard, the PAGE_GUARD page protection modifier may be set with respect to a particular page. This value may be specified, along with other page protection modifiers, by way of non-limiting example, in various functions such as VirtualAlloc. The PAGE_GUARD modifier may also be used with any other page protection modifiers. In one embodiment, if a code attempts to access an address within a guard page, the system may raise an exception or any other type of violation. Although the principles described herein are especially relevant to the Microsoft® Windows® operating system, many other operating systems and platforms, including without limitation, Apple OS®, iOS®, Android®, Linux®, etc. may also be utilized. At block 410, access events comprising read, write and/or execute operations are monitored and stored, and particular attention is paid with respect to the source of such access attempts. In the event that a guarded area is accessed, an exception is generated at block 415 by the event logic as discussed herein. At block 420, the dynamic analysis server as discussed herein generate a log file comprising access events. At block 440, detection logic is applied to the log file to determine whether an access event is malicious or not. At block 460, after applying the detection logic as discussed in more detail below, a report/alert may be generated. The report/alert may be communicated to the user or a network administrator, for example, and/or stored for further analysis by the analysis network.

Figure 5:
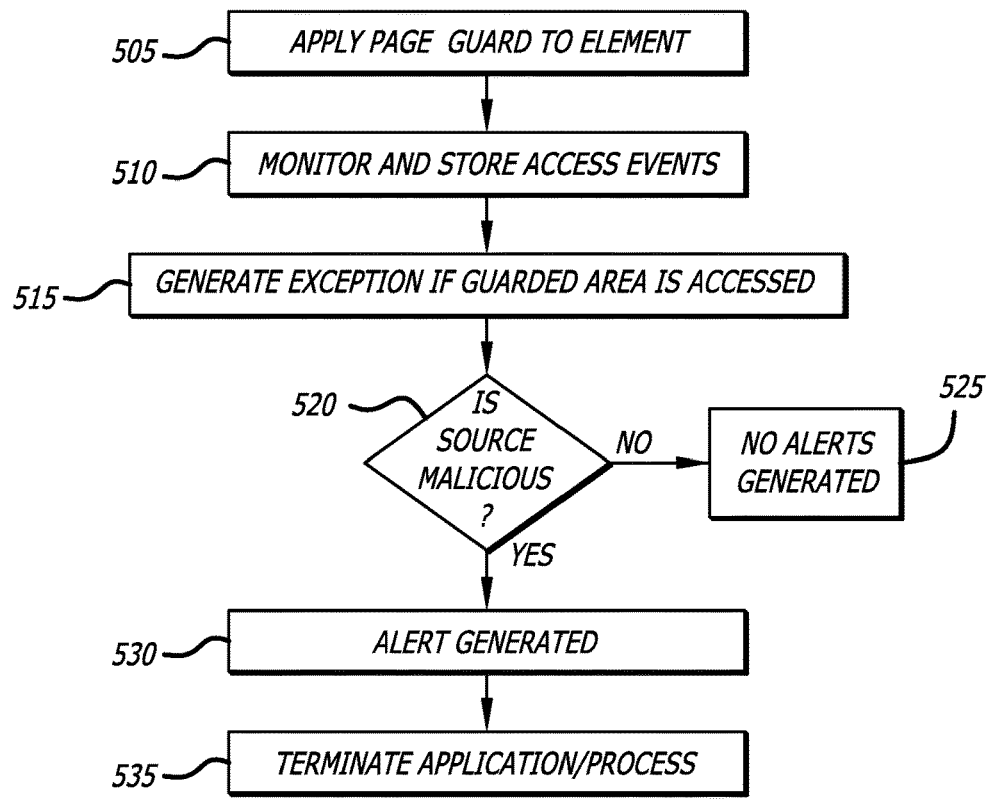
FIG. 5 is an exemplary block diagram of an alternative operational flow of an application-execution hijacking detection system.

FIG. 5 is an exemplary block diagram of an alternative operational flow of an AEH detection system that is substantially similar to the flow described in FIG. 4, except that instead of generating an output file, the potentially malicious object and/or corresponding operation is terminated. For example, at block 505, a page guard is applied to an element of a loaded module, such as by way of non-limiting example, a base address, import table (IT), and/or a process environment block. At block 510, access events are monitored and stored, and particular attention is paid to the source of such access attempts. At block 520, if the access source is determined to be non-malicious, no alert is generated. At block 530, if the access source is indeed malicious, an alert may be generated. Furthermore, if the access source is malicious, the corresponding object and/or process may be terminated, and therefore prevented from executing, as shown at block 535. As stated above, it is envisioned that a probabilistic analysis may also be used in determining whether or not an alert should be generated. For example, the occurrence of an access event may indicate to some level of probability, often well less than 100%, that the access event comprises a certain exploit or exhibits certain elements associated with malware. In one embodiment, the rule-matching logic 150 may be configured to take certain action, including for example, generating an alert if the probability exceeds a prescribed value, for example.

FIGS. 6-9 are flowcharts of exemplary methods for detecting AEH malware, that may be implemented using the rule-matching logic as discussed herein so as to establish a protected region.

Figure 6:
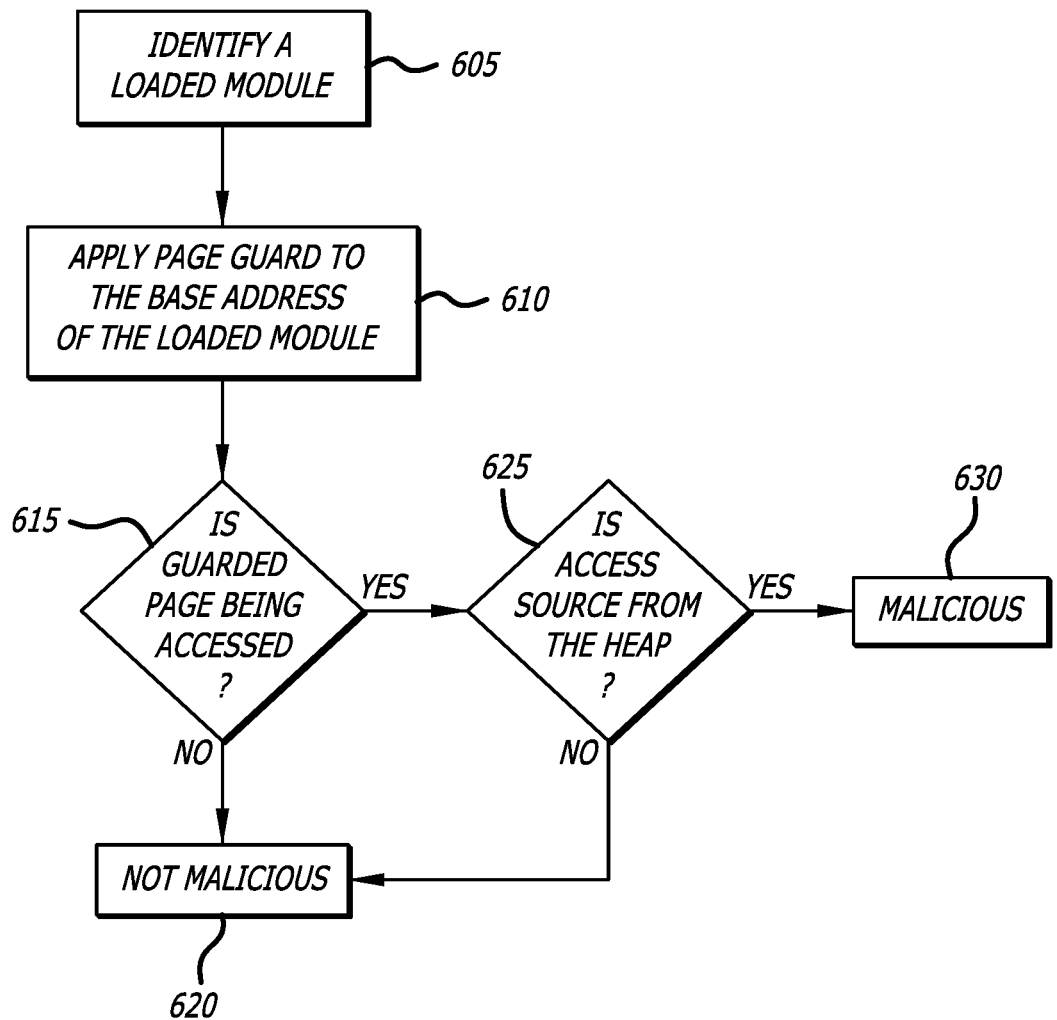
FIG. 6 is a flowchart of an exemplary method for detecting application-execution hijacking malware by applying a guard page to a base address of a loaded module.

Specifically, FIG. 6 shows an exemplary method for detecting AEH malware by applying any of various protection mechanisms such as, by way of non-limiting example, applying a page guard to the base address of a loaded module so as to establish a protected region. At block 605, a loaded module is identified. At block 610, a page guard is applied to the base address of the loaded module as discussed herein, although any number of methods may be used. At block 615, rule-matching logic is configured to determine whether a guarded page is being accessed. If the result of this query is "no", then there is a high likelihood that the access attempt is not malicious. If the result at block 615 is "yes", then a second query is presented at block 625.

Specifically, at block 625, the rule-matching logic determines whether the access source is from the heap. In one embodiment, exceptions may comprise context information including for example, values in certain registers at the time the exception was generated that correspond to the address of a source instruction that attempted to access a page guarded area. Once the address of the source instruction is known, a plurality of methods may be used to determine if the address is from the heap. For example, the operating system may provide an API that is configured so as to retrieve information corresponding to the memory at any address. It is envisioned that the API may return a structure that includes information such as memory type. If the memory type is "MEM_IMAGE" then the address is from a loaded module. If the memory type is not "MEM_IMAGE" type, then it is from the heap, and likely malicious. If the result at block 625 is "no", then there is a high likelihood that the access attempt is not malicious. On the other hand, if the result at block 625 is "yes", then there is a high likelihood that the access attempt is indeed malicious. In some embodiments, if it is determined that an access attempt is malicious, then an alert may be generated and communicated as discussed herein.

Figure 7:
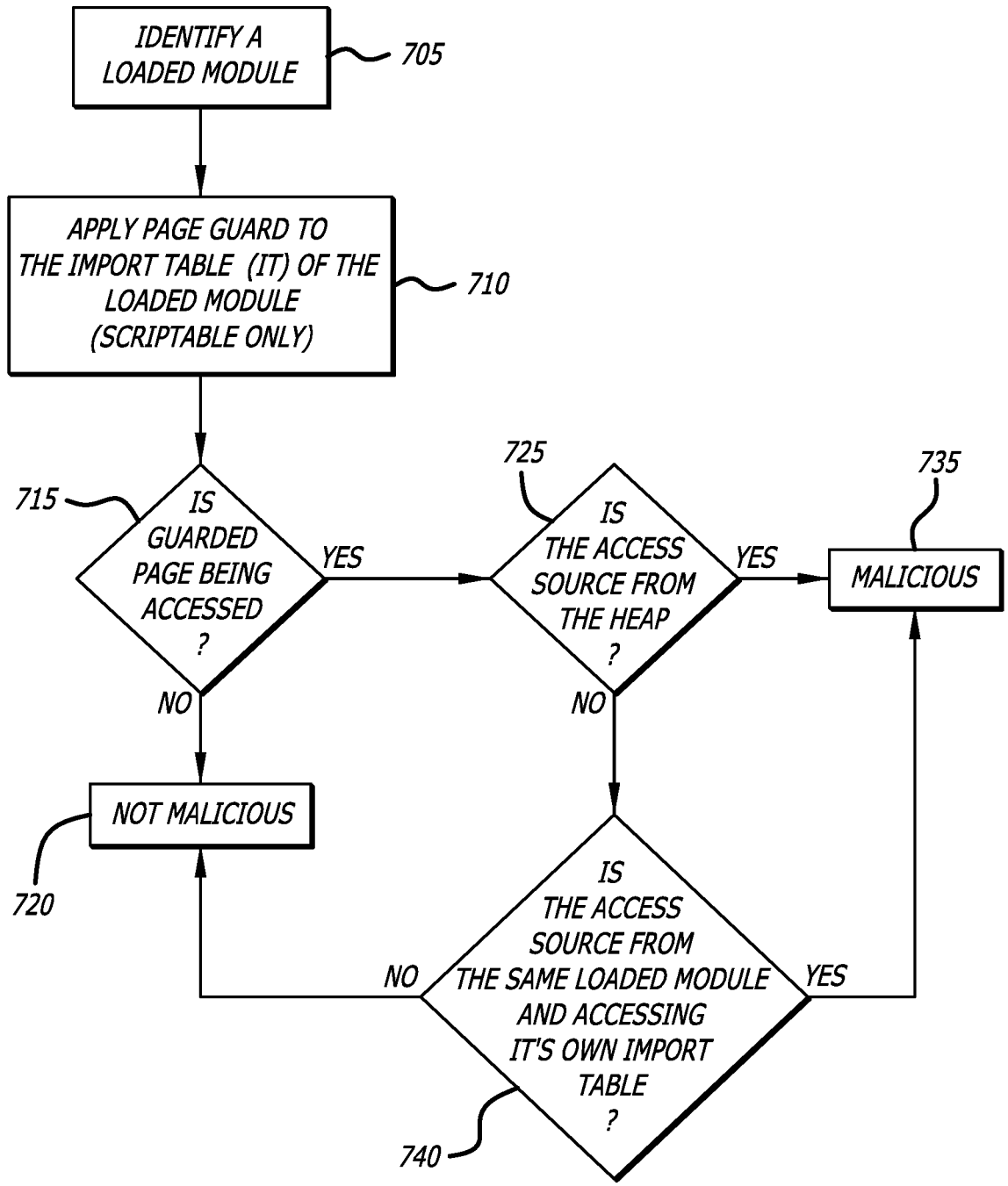
FIG. 7 is a flowchart of an exemplary method for detecting application-execution hijacking malware by applying a guard page to an import table of a loaded module.

FIG. 7 is a flowchart of an exemplary method for detecting application-execution hijacking malware by applying a guard page to an import table (IT) of a loaded module. In general, the IT is used as a lookup table when an application is calling a function in a different module. Accordingly, at block 705, a loaded module is identified, and at block 710, a protection mechanism such as a page guard is applied to the IAT of the loaded module as discussed herein, although any number of methods may be used so as to establish a protected region. As indicated at block 710, however, the instant method is only applicable with respect to scriptable DLLs that provide a scripting environment to applications, such as, by way of non-limiting example "jscript", "vbscript", and "flash.ocx". At block 715, the rule-matching logic determines whether a guarded page is being accessed. If the result of this query is "no", then there is a high likelihood that the access attempt is not malicious. If the result at block 715 is "yes", then a second query is analyzed at block 725. Specifically, the rule-matching logic determines whether the access source is from the heap. If the result of this query is "yes", then there is a high likelihood that the access attempt is malicious. If the result of this query is "no", then a third query is presented at block 740. Specifically, at block 740, the rule-matching logic is configured to determine whether the access source is from the same loaded module, and accessing its own import table. If the result of this query is "no", then there is a high likelihood that the access attempt is not malicious. On the other hand, if the result of this query is "yes", then there is a high likelihood than the access attempt is malicious, as indicated at block 735.

Figure 8:
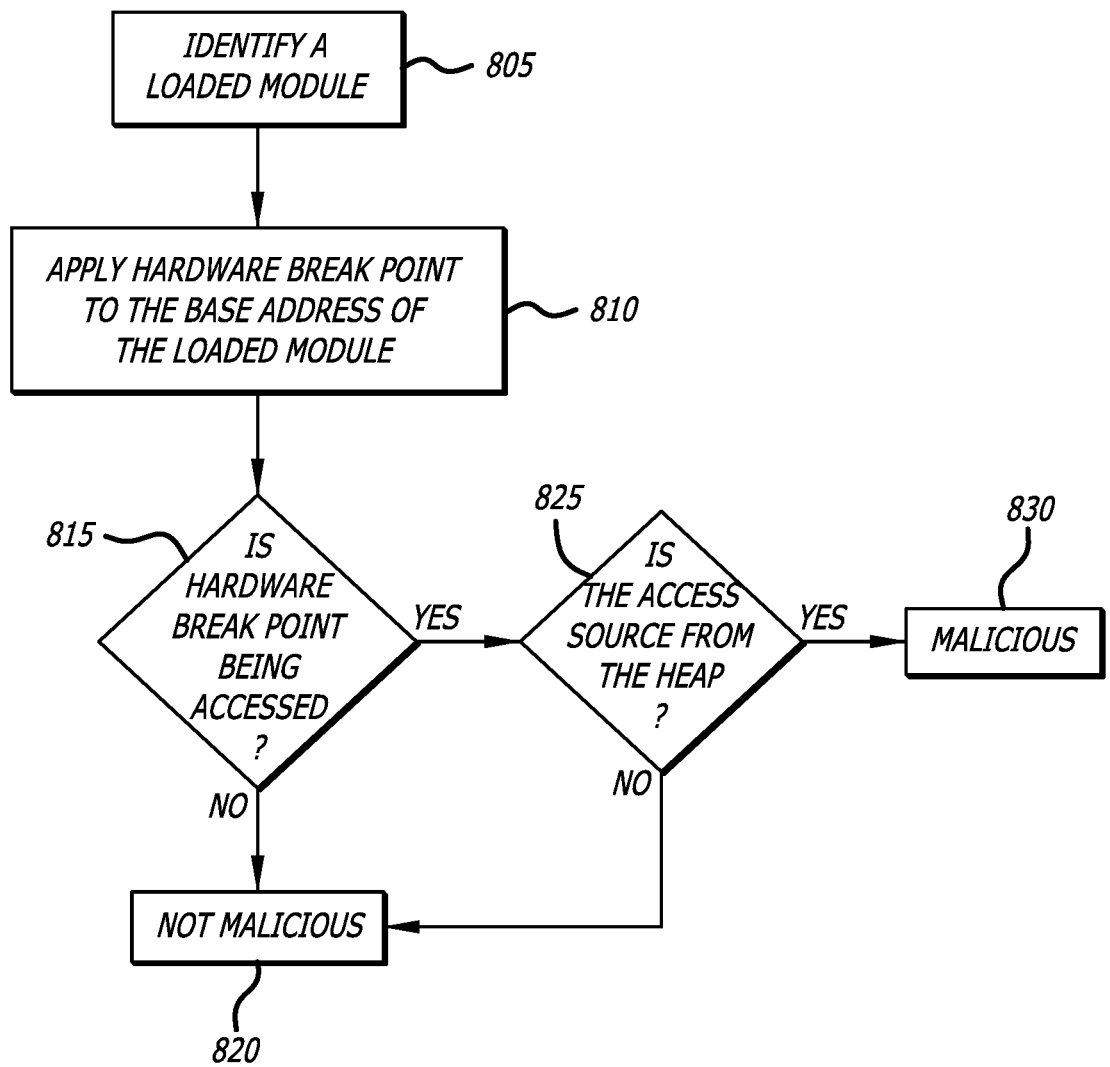
FIG. 8 is a flowchart of an exemplary method for detecting application-execution hijacking malware by applying a hardware breakpoint to a base address of a loaded module.

FIG. 8 is a flowchart of an exemplary method for detecting AEH malware by applying a hardware breakpoint to a base address of a loaded module. At block 805, a loaded module is identified. At block 810, a hardware breakpoint is applied to the base address of the loaded module. Unlike software breakpoints, hardware breakpoints may be configured to establish breakpoints that are initiated when any instruction attempts to read, write, and/or execute a specific memory address. It should be appreciated, however, that hardware breakpoints have certain limitations, including for example the limited number of hardware breakpoints that may be active simultaneously. In some embodiments, for example, only four hardware may be active at the same time.

At block 815, the rule-matching logic determines whether a hardware breakpoint is being accessed. If the result of this query is "no", then there is a high likelihood that the access attempt is not malicious. If the result at block 815 is "yes", then a second query is analyzed at block 825. Specifically, the rule-matching logic determines whether the access source is from the heap. If the result at block 825 is "no", then there is a high likelihood that the access attempt is not malicious. On the other hand, if the result at block 825 is "yes", then there is a high likelihood that the access attempt is indeed malicious. In some embodiments, if it is determined that an access attempt is malicious, then an alert may be generated as discussed herein.

Figure 9:
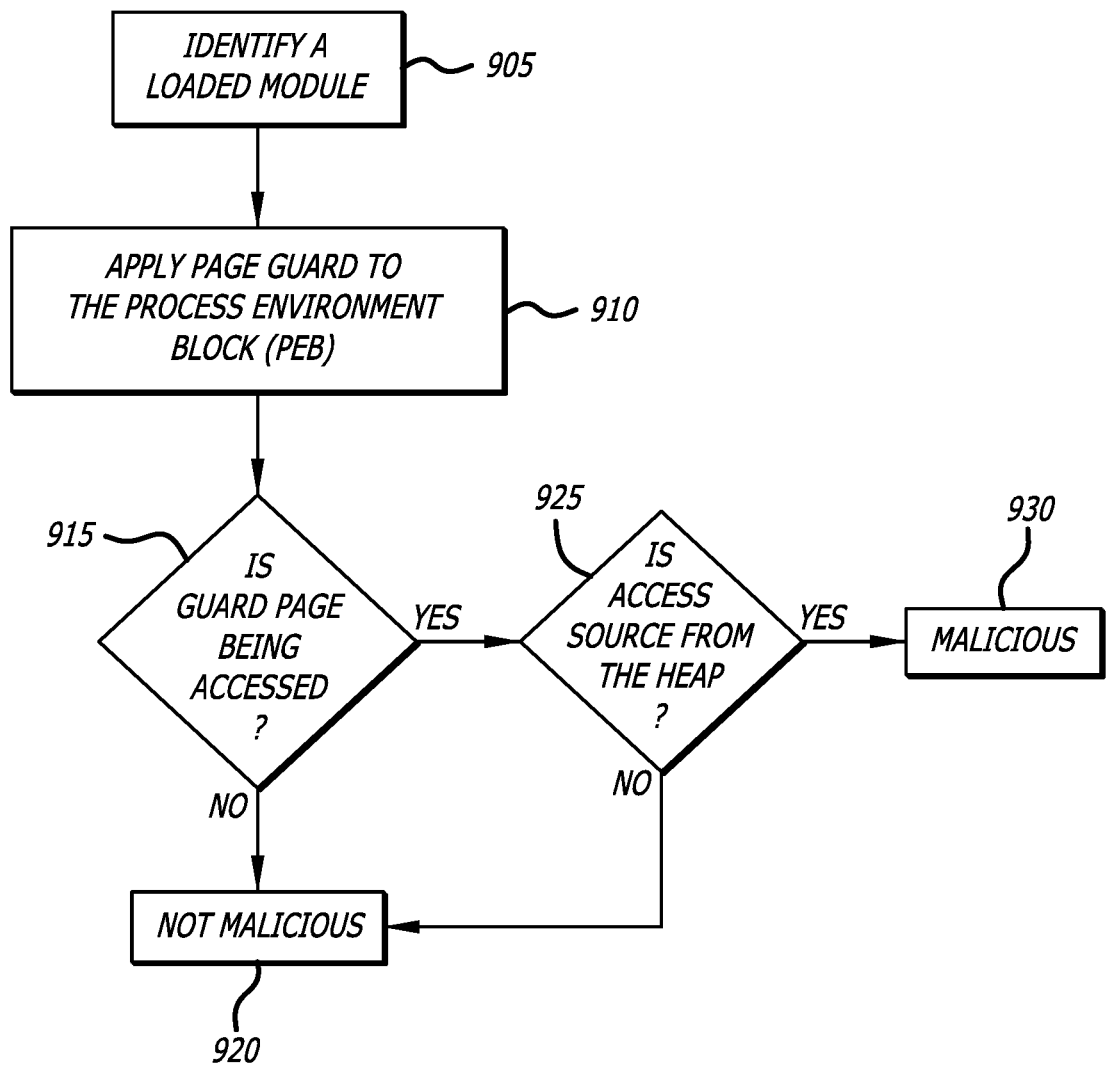
FIG. 9 is a flowchart of an exemplary method for detecting application-execution hijacking malware by applying a guard page to a process environment block of a loaded module.

FIG. 9 is a flowchart of an exemplary method for detecting application-execution hijacking malware by applying a protection mechanism such as a page guard to a process environment block of a loaded module. It should be understood that the process environment block (PEB) is a data structure that is internally utilized by an operating system, most of whose fields are not intended for use by anything other than the operating system. Conventionally, the PEB comprises data structures that apply across a whole process, including global context, startup parameters, data structures for the program image loader, the program image base address, and synchronization objects used to provide mutual exclusion for process-wide data structures, for example.

Consequently, at block 905, a loaded module is identified. At block 910, a protection mechanism, such as a page guard is applied to the process environment block of the loaded module as discussed herein, although any number of methods may be used so as to establish a protected region. At block 915, the rule-matching logic determines whether a guarded page is being accessed. If the result of this query is "no", then there is a high likelihood that the access attempt is not malicious. If the result at block 915 is "yes", then a second query is analyzed at block 925. Specifically, the rule-matching logic determines whether the access source is from the heap. In one embodiment, the operating system may provide an API that is configured so as to retrieve information corresponding to the memory at any address. For example, the API may return an output structure that includes information such as the memory address. Similarly, the PEB may be configured so as to provide a list of all of the loaded modules, including, for example, DLLs. The list of all of the loaded modules from the PEB may be analyzed and compared with the output structure to determine if a particular address is from the heap, and therefore malicious. If the result at block 925 is "no", then there is a high likelihood that the access attempt is not malicious. On the other hand, if the result at block 925 is "yes", then there is a high likelihood that the access attempt is malicious. In some embodiments, if it is determined that an AEH attack is present, then an alert may be generated as discussed herein.

It should be understood that unless otherwise indicated, the principles described herein are not exclusive to any particular operating system, and thus, systems and methods may be implemented in and/or executed using many operating systems and platforms, including without limitation, Windows®, Apple OS®, iOS®, Android®, etc.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. An electronic device, comprising:
one or more processors; and
a non-transitory storage medium communicatively coupled to the one or more processors, the non-transitory storage medium includes one or more software modules and logic that, upon execution by the one or more processors, performs operations comprising:
applying a page guard to an element of a stored software module of the one or more software modules, the page guard being code that detects a potential application-execution hijacking attack,
determining whether an access source is attempting to access the stored software module,
storing access events associated with the attempted access to the stored software module within a log file,
analyzing information associated with each of the stored access events corresponding to the attempted access within the log file by at least (i) conducting, in accordance with prescribed rules, an analysis of the information associated with the stored access events to produce a result, the result including a non-zero probability value of the stored access event is malicious, (ii) comparing the probability value to a prescribed threshold value, the attempted access is determined to be malicious based on, at least in part, a determination that the probability value exceeds a prescribed threshold value, and (iii) determining whether the access source is from a prescribed region of dynamically allocated memory, and
generating an alert when the result signifies that the attempted access is determined to be malicious, the alert comprises information associated with the access source being an object that, upon execution, is attempting to access the stored software module, the information includes a source of the access events and information associated with the dynamically allocated memory.

2. The electronic device of claim 1, wherein the element of the stored software module comprises a base address of a loaded module.

3. The electronic device of claim 1, wherein the element of the stored software module comprises the import table of the loaded module.

4. The electronic device of claim 1, wherein the element of the stored software module comprises a process environment block.

5. The electronic device of claim 1, wherein the alert to notify a user or a network administrator of the potential application-execution hijacking attack being a malicious access.

6. The electronic device of claim 1, wherein the logic that, upon execution by the one or more processors, further performs the operations comprising:
   terminating the loaded module so as to prevent an application-execution hijacking attack being a malicious access.

7. The electronic device of claim 1, wherein the prescribed memory region associated with the dynamically allocated memory includes a heap.

8. The electronic device of claim 7, wherein at least one of the access events associated with the attempted access includes an exception, the exception comprises context information including one or more register values at the time the exception was generated and the one or more register values correspond to an address of a source instruction that attempted to access the stored software module guarded by the page guard.

9. The electronic device of claim 8, wherein the attempted access is malicious when the address of the source instruction correspond to an address of a heap.

10. A non-transitory storage medium including logic that, upon execution by the one or more processors, detects an application-execution hijacking, the non-transitory storage medium comprising:
   logic to identify a loaded module stored in a memory;
   logic to determine whether an access source is attempting to access the loaded module based on use a page guard applied to an element of the loaded module, the page guard being code that detects an attempted access to an address associated with the loaded module to detect a potential application-execution hijacking attack;
   logic to raise an exception or memory access violation when a code attempts to access an address within the page guard, the attempted access corresponding to one or more access events;
   logic to store the one or more access events within a log file,
   logic to analyze information associated with each of the one or more access events within the log file by at least (i) conducting an analysis, in accordance with prescribed rules, on the information associated with the one or more access events to produce a result, the result including a non-zero probability value of the stored access event is malicious, (ii) comparing the probability value to a prescribed threshold value, the access being determined to be malicious based, at least in part, a determination that the probability value exceeds a prescribed threshold value, and (iii) determining on whether the access source is from a prescribed region of the memory associated with dynamically allocated memory, and
   logic to generate an alert when the result signifies that the access is determined to be malicious, the alert comprises information associated with the access source being an object that, upon execution, is attempting to access the prescribed region of the memory, the information includes a source of the access events and a type of the memory.

11. The non-transitory storage medium of claim 10, wherein the element of the loaded module comprises a base address of the loaded module.

12. The non-transitory storage medium of claim 10, wherein the element of the loaded module comprises an import table of the loaded module.

13. The non-transitory storage medium of claim 10, wherein the element of the loaded module comprises a process environment block being a data structure that is internally utilized by an operating system.

14. The non-transitory storage medium of claim 10, wherein the alert to notify a user or a network administrator of the potential application-execution hijacking attack.

15. The non-transitory storage medium of claim 10, wherein the logic that, upon execution by the one or more processors, further comprising:
   logic to terminate the loaded module so as to prevent an application-execution hijacking attack.

16. The non-transitory storage medium of claim 10, wherein the dynamically allocated memory corresponds to a heap.

17. The non-transitory storage medium of claim 16, wherein the logic to generate the alert comprises logic that, upon execution by the one or more processors, generates the alert to communicate details of an access event.

18. A method comprising:
   applying a page guard to an element of a stored software module of the one or more software modules, the page guard being code that detects a potential application-execution hijacking attack;
   determining whether an access source is attempting to access the stored software module;
      storing access events associated with the attempted access to the stored software module within a log file;
   analyzing information associated with each of the stored access events corresponding to the attempted access within the log file by at least (i) conducting, in accordance with prescribed rules, an analysis of the information associated with the stored access events to produce a result, the result including a non-zero probability value of the stored access event is malicious, (ii) comparing the probability value to a prescribed threshold value, the attempted access is determined to be malicious based on, at least in part, a determination that the probability value exceeds a prescribed threshold value, and (iii) determining whether the access source is from a prescribed region of dynamically allocated memory; and
   generating an alert when the result signifies that the attempted access is determined to be malicious, the alert comprises information associated with the access source being an object that, upon execution, is attempting to access the stored software module, the information includes a source of the access events and information associated with the dynamically allocated memory.

19. The method of claim 18, wherein the element of the stored software module comprises a base address of the stored software module.

20. The method of claim 18, wherein the element of the stored software module comprises an import table of the stored software module.

21. The method of claim 18, wherein the element of the stored software module comprises a process environment block being a data structure that is internally utilized by an operating system.

22. The method of claim 18, wherein the alert to notify a user or a network administrator of the potential application-execution hijacking attack.

* * * * *